March 22, 1960     B. I. ULINSKI     2,929,460
STEERING AND TRACTION UNIT CONSTRUCTION
Filed Dec. 23, 1955     3 Sheets-Sheet 1

INVENTOR.
B. I. Ulinski
BY
ATTORNEY

March 22, 1960     B. I. ULINSKI     2,929,460
STEERING AND TRACTION UNIT CONSTRUCTION
Filed Dec. 23, 1955     3 Sheets-Sheet 2

INVENTOR.
B. I. Ulinski
BY
ATTORNEY

INVENTOR.
B. I. Ulinski
BY
ATTORNEY

United States Patent Office 2,929,460
Patented Mar. 22, 1960

2,929,460

STEERING AND TRACTION UNIT CONSTRUCTION

Bronislaus I. Ulinski, Flossmoor, Ill., assignor to The Yale & Towne Manufacturing Company, Stamford, Conn., a corporation of Connecticut Application December 23, 1955, Serial No. 555,064

5 Claims. (Cl. 180—13)

This invention relates to a motorized industrial truck of that type in which a steering and traction unit at one end of the truck is adapted to contribute combined steering and traction to the entire truck. In general, the steering and traction unit comprises a motor and gearing, together with a traction wheel operated by the motor through the gearing, the entire unit being assembled for rotation relatively to the main frame of the truck for the purpose of steering the truck. The steering rotation is effected usually by a steering lever mounted on the steering and traction unit and carrying suitable controls for controlling the operation of the motor and brake of the unit.

In trucks of the particular class, the mounting of the traction wheel relatively to the steering and traction unit presents a very considerable problem. It is important so to mount the traction wheel as to limit the stresses that are inherent between the steering and traction unit and the main frame of the truck, and that are accepted by the bearings through which the unit is mounted on the frame. Theoretically, the stresses can be kept at a minimum by arranging the traction unit bearing and the wheel close to one another, but this arrangement has a practical limit since the bearings must leave room for the wheel and for the means through which the wheel is driven. A further difficulty is presented if only a small space is left for the wheel itself, since this creates a problem as to how the wheel or its tire can easily be demounted for the purpose of changing the tire, when that is necessary. For these reasons, considerable difficulty is involved in the designing of structure whereby a traction wheel is mounted in a truck of the class described.

I have now conceived by my invention an extremely novel structure that enables me to mount the traction wheel and the traction unit bearing in very close proximity to one another, thus reducing to a very great extent the stresses that are accepted by the bearing, but nevertheless enabling the wheel to be very easily demounted. I make this possible through the utilization of an "outrigger" type of steering and traction wheel, with the wheel demountable through movement endwise relatively to its axle. I then utilize for mounting the steering and traction unit a circular bearing that is relatively small in diameter and that is located at a very low point on the unit.

As a particular feature of my invention, I form the traction unit with an open chamber that is substantially in horizontal aligned relation to the circular bearing on which the steering and traction unit rotates relatively to the main frame of the truck. With this chamber horizontally aligned relatively to the bearing, I mount the steering and traction wheel to rotate with its upper portion in the chamber, this chamber making available sufficient room for the wheel to be demounted through movement endwise off the axle, on which it is mounted in "outrigger" fashion. The inventive concept resides in the arrangement of the traction unit bearing in aligned relation to a chamber formed on the unit for the wheel, thus lowering the level of the bearing, but enabling the bearing to have a relatively small diameter while still permitting the wheel to be demounted from its axle.

As a further part of this feature of my invention, I construct the gear casing with a narrow part that lies within the circular bearing at one side of the chamber of the steering and traction unit, this part of the casing also being horizontally aligned relatively to the chamber and bearing. It is through this narrow part of the casing that I support the lower end of the casing on which the wheel is mounted relatively to the upper part of the steering and traction unit and the bearings on which the unit rotates. This feature makes possible the utilization of the outrigger wheel and chamber for the purposes set forth. Thereby I am able to utilize a traction unit bearing that has a relatively small diameter and that is relatively low so as to keep at a minimum the forces that are accepted by the bearing, and also contributing the stability that is extremely important in trucks of the particular class.

As a further feature of the invention, the steering and traction wheel is mounted on its axle, and is retained on that axle, by means having a dual function. Thus, the said means act to retain the wheel on the axle, but are adapted upon predetermined operation to function as a wheel puller. This is an exceedingly important relationship of the parts, because it makes possible the easy application of my wheel to the rather novel form of mounting required in order to make possible the other contributions of my invention herein to be set forth.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Figure 1:
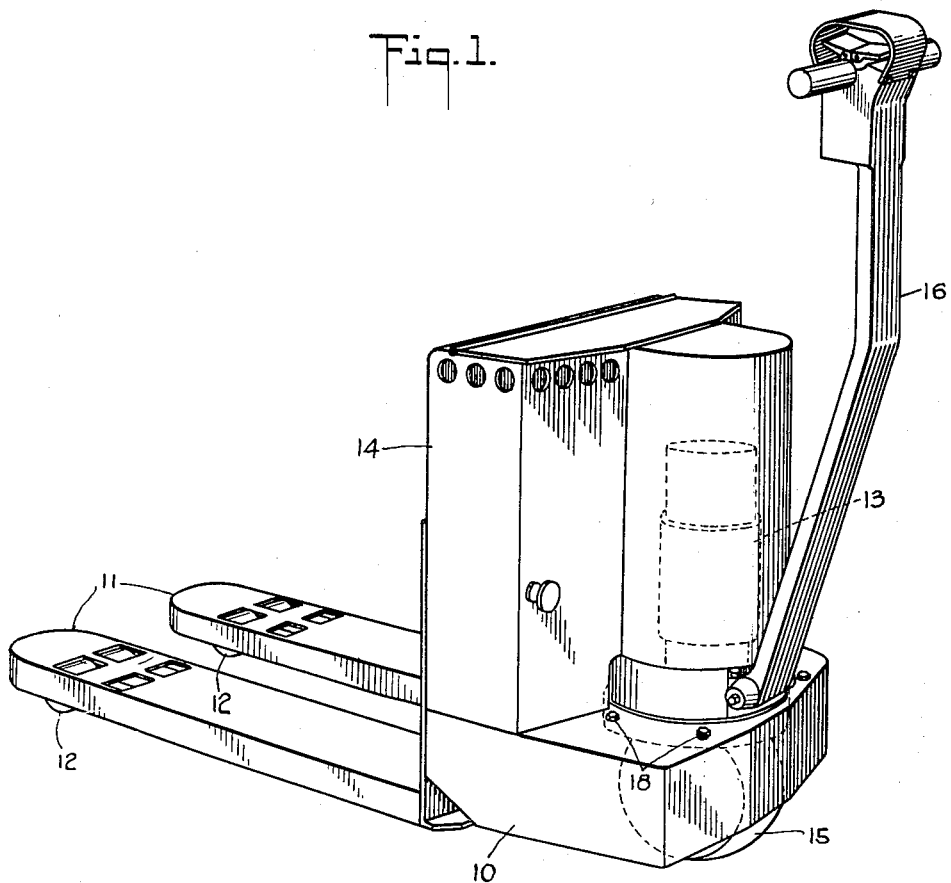
Fig. 1 shows an industrial truck that utilizes my novel steering and traction unit construction.

Referring now more particularly to Fig. 1 of the drawings, I show a motorized industrial truck of the particular class having a main frame 10 with a rearwardly extending load platform 11, rear load wheels 12, and a steering and traction unit 13 at the front end of the truck. Just rearwardly of the unit 13, the truck has a battery compartment 14 on the main frame 10. Those skilled in the art will appreciate that the steering and traction unit 13 is equipped with a ground engaging wheel 15 and a pivoted steering and control handle 16, and is mounted to rotate bodily on the main frame 10 for steering the truck.

Figure 2:
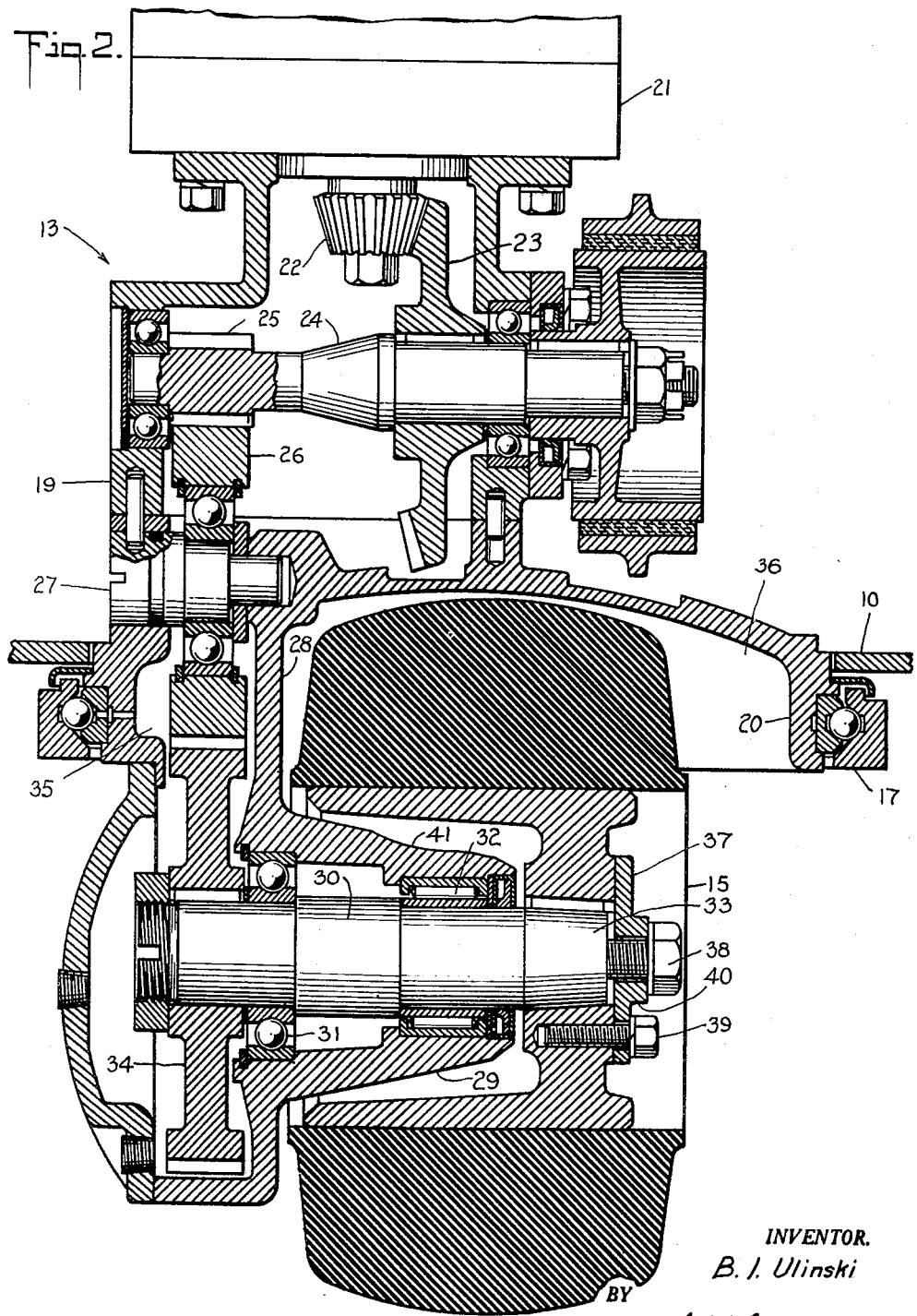
Fig. 2 is a vertical section showing my invention.

In my invention, I utilize for mounting the steering and traction unit 13 a circular bearing assembly 17, Fig. 2, that is arranged at a relatively low point on the truck. I prefer to construct the bearing assembly 17 like that shown in my earlier application, Serial No. 543,658, now matured into Patent No. 2,842,216, dated July 8, 1958, with the assembly secured to the under side of the main frame 10 through screws 18, Fig. 1, but the detailed construction of the bearing assembly 17 is not important to an understanding of the invention that I claim in this application. It is necessary here to know merely that the circular bearing assembly 17 acts at a low level to mount the steering and traction unit 13 for steering rotation on the truck.

Referring again to Fig. 2, I utilize for the body portion of the steering and traction unit 13 a gear casing 19, and I form that casing 19 with a circular part 20 that is encircled by the bearing assembly 17 whereby to support the unit 13. I shall not go into detail as to the upper part of gear casing 19, but it may be observed briefly that the upper part of the casing is formed to support a traction motor 21 having a pinion 22. This pinion 22 drives a bevel gear 23 that is keyed to a shaft 24 rotating on the casing, this shaft 24 being formed with a pinion 25 that drives an idler gear 26 on a shaft 27. On the other hand, it is important here to understand the construction of the lower part of the gear casing 19. Thus, it is necessary to observe that I form gear casing 19 with a narrow portion 28 that extends downwardly at one side of the steering and traction unit, making possible the use of the domed chamber, to be described presently, in the circular part 20 of which the narrow portion 28 of the casing is a part. As is shown in Fig. 2, the narrow casing portion 28 is in horizontally aligned relation to the circular part 20 and the bearing assembly 17 on which the unit rotates relatively to the main frame.

Below the narrow casing portion 28 I form the casing with an axle mounting portion 29 that supports an axle 30 in a horizontal position, with one end of the axle extending outwardly from the casing toward the opposed side of the steering and traction unit 13, or in other words toward the right as viewed in Fig. 2. The axle 30 rotates at its inner end on bearings 31, and at its medial portion on bearings 32 that preferably are arranged to lie near the vertical axis of the steering and traction unit 13. I form the outer end portion of axle 30 with a tapered surface 33 to which I key the traction wheel 15, the axle then supporting the wheel substantially in the axis of rotation of the traction unit on bearings 17. Keyed to the inner end of axle 30 is a gear 34 that is meshed with the idler gear 26 in an opening 35 in the narrow casing portion 28, thus enabling the traction motor 21 to drive the wheel 15 through means within the narrow casing portion 28.

Through the construction I have thus far described, I mount the traction wheel 15 in outrigger fashion, with the wheel supported below the narrow casing portion 28 at one side of the traction unit and driven by the single vertical gear connection housed in narrow portion 28, including gears 26, 34. As a further important part of my invention, I form the circular part 20 of gear casing 19 with a domed chamber 36 that is in horizontally aligned relation to the bearing assembly 17 on which the steering and traction unit is steered. This chamber 36 is so formed as to extend between the narrow casing portion 28 and the opposed side of the traction unit, and enables the upper part of traction wheel 15 to be arranged within the diameter of circular bearing assembly 17, as shown in Fig. 2. Thereby I can place bearing assembly 17 at a low point on the truck. Even more important, I can make the domed chamber 36 relatively large while the bearing assembly 17 is relatively small in diameter, since the outrigger wheel mounting that I utilize requires merely the narrow casing portion 28 lying within the diameter of bearing assembly 17, leaving considerable space in the bearing diameter for chamber 36. The chamber 36 will therefore contribute ample room for movement of the traction wheel 15 in an axial direction, so that the wheel 15 can be demounted from axle 30. This can be done despite the fact that the bearing assembly 17 is in a position that is quite low, and also has a relatively small diameter.

Figure 3:
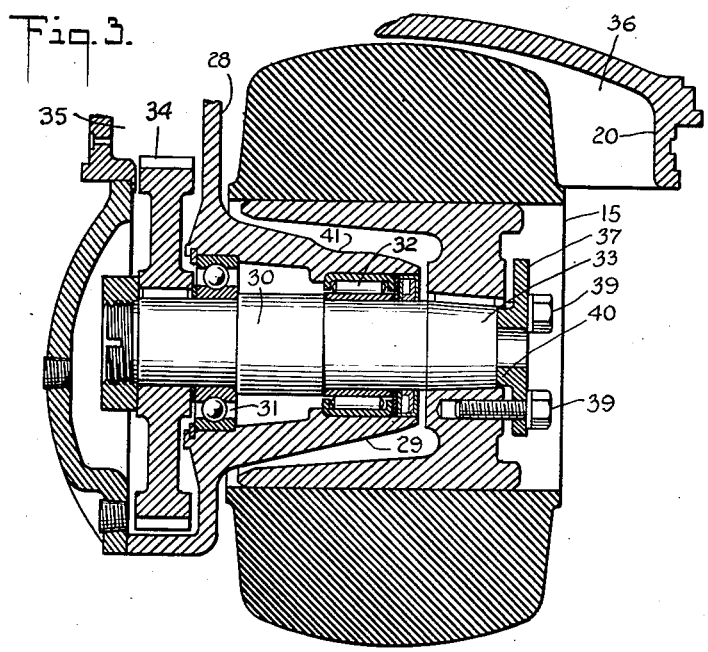
Figs. 3 and 4 are similar to Fig. 2, but illustrate the removal of the wheel from the steering and traction unit.

In order that the manner in which I demount the wheel 15 may be fully understood, I shall now describe the novel means through which I assemble the wheel 15 to its axle. Referring to Fig. 2, it will be seen that I utilize a plate 37 that is adapted to overlie the outer surface of the traction wheel 15, with an opening in the plate through which a bolt 38 is threaded into the end of the axle 30. I utilize further a series of screws 39 that are inserted through openings in the plate 37 and threaded into the wheel 15. When the bolt 38 is tightened, the plate 37 will naturally hold the wheel 15 assembled on the tapered axle end 33. It is important to observe that I equip the plate 37 with a lug 40, this lug 40 being formed on what is normally the outer side of the plate 37. When the wheel 15 is to be demounted, the plate 37 will first be removed through removal of the bolts 38, 39, and then reversed so that the lug 40 is against the end surface of the axle 30, as is well shown in Fig. 3. It is then necessary merely to insert the screws 39 and to tighten those screws, thus pressing the plate 37 toward the wheel. Thereby plate 37 will draw the wheel from the tapered axle portion 33, and will move the wheel 15 axially away from its mounted position.

Figure 4:
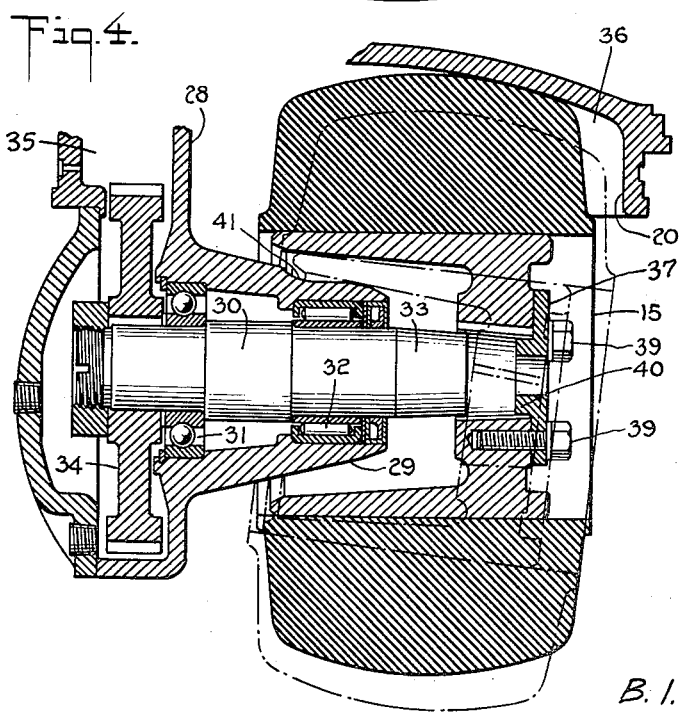

After some axial movement of wheel 15, the wheel will have sufficient clearance relatively to the axle to tilt, as is indicated in dotted lines in Fig. 4. Through this tilting movement, it will be possible to effect sufficient clearance between the upper periphery of the traction wheel 15 and the lower edge of the domed portion 36 of the traction unit, so that the wheel can move easily away from axle 30. In order to facilitate somewhat the removal of the wheel 15, I show the axle mounting portion 29 of the gear casing formed on its upper surface with a depression 41. This depression 41 will effect further clearance between the casing and the left hand edge of the wheel, as viewed in Fig. 4, but is not essential to my invention.

Through the extremely novel steering and traction unit construction that I have described, I am able to mount in rather close proximity to one another the traction wheel and the bearing assembly on which the unit is steered. This I do through the utilization of a narrow gear casing portion and a chamber that are aligned horizontally relatively to the bearing assembly of the unit, enabling me to place the bearing assembly at a very low point on the truck, while also making the bearing assembly rather small in diameter. Thereby I am able to reduce to a very large extent the stresses that are accepted by the bearing assembly. I accomplish this moreover while making possible the easy removal of the traction wheel from the steering and traction unit. I believe, therefore, that those skilled in the art will appreciate the very considerable value of my invention.

I now claim:

1. In a truck of the class described, a steering and traction unit comprising a motor, a gear housing, an axle secured at one end thereof in the lower part of said gear housing with its other end projecting outwardly from said housing, a traction wheel having a bearing at one side thereof whereby it is mounted on said outward portion of said axle, said wheel extending radially away from said axle and then laterally towards said gear housing with clearance relatively to that portion of said gear housing in which said axle is mounted, gearing in said gear housing for transmitting power from said motor to said wheel, a portion of said housing forming a dome shaped chamber over said wheel and into which said wheel extends, the lower edge of said chamber lying below the uppermost periphery of said wheel, a circular bearing on said gear housing extending about said chamber and said lower part of said gear housing at a level just above the lower edge of said chamber below the uppermost periphery of said wheel, said chamber being of sufficient size to allow removal of the wheel from said axle by the tilting of said wheel after some axial movement thereof relatively to said axle, and said wheel having sufficient clearance relatively to the portion of the gear housing on which said axle is mounted to allow said tilting.

2. In a truck of the class described, a steering and traction unit comprising a motor, a gear housing, a part of said gear housing formed to extend downwardly at one side of the steering and traction unit, an axle mounted on said part of the gear housing with one end portion of the axle extending toward the opposed side of the steering and traction unit, a traction wheel having a bearing at one side thereof whereby it is mounted on said end portion of the axle, said wheel extending radially away from said axle and then laterally towards said gear housing with clearance relatively to that portion of said gear housing in which said axle is mounted, gearing in said part of the gear housing for transmitting power from said motor to said wheel, a portion of said housing forming a dome shaped chamber over said wheel and into which the uppermost periphery of said wheel extends, said chamber lying between the said part of the housing at one side of the unit and the side of the unit toward which the axle extends whereby to allow room for removal of the wheel from said axle by the tilting of said wheel after some axial movement thereof relatively to said axle, said wheel having sufficient clearance relatively to the portion of the gear housing on which said axle is mounted to allow said tilting, and a circular bearing race in a horizontal position on the outer surface of the gear housing near the lower edge of said chamber whereby to lie below the uppermost periphery of the wheel.

3. In a truck of the class described, a steering and traction unit comprising a motor, a gear housing below said motor, an axle secured at one end thereof within the lower part of said gear housing and having its other end projecting outwardly from said gear housing in a horizontal direction when said gear housing is in its operative assembled relation to said truck, a traction wheel having a bearing at one side thereof whereby it is mounted on said outward portion of said axle, said wheel extending radially away from said axle and then laterally towards said gear housing with clearance relatively to that portion of said gear housing in which said axle is mounted, a gear mounted on the inner end of said axle within said gear housing, a portion of said housing forming a dome-shaped chamber over said wheel and into which said wheel extends, the lower edge of said chamber lying below the upper periphery of said wheel, said chamber being of sufficient size to allow removal of the wheel from said axle by the tilting and axial movement thereof relatively to said axle, said wheel having sufficient clearance relatively to the portion of the gear housing on which said axle is mounted to allow said tilting, and a circular bearing race on said gear housing extending about said chamber and said lower part of said gear housing and at a level just above the lower edge of said chamber whereby said gear housing is mounted for rotation on said truck with said wheel functioning as a steering wheel.

4. In a truck of the class described, a steering and traction unit comprising a gear housing, a lateral extension at the lower end of said gear housing, an axle mounted in said extension of the gear housing and having a wheel supporting portion extending outwardly of said gear housing, a traction wheel having a bearing whereby it is mounted on said axle portion extending from the gear housing, a circular bearing horizontally disposed between said gear housing and truck at a line below the upper peripheral portion of said wheel and supporting said gear housing for rotation relatively to said truck, the center of said bearing forming the steering axis of the truck, said wheel having a rim portion extending from its bearing on said axle and about the said extension of said gear housing and having predetermined clearance relatively to said gear housing, a portion of said housing above said circular bearing forming a chamber overlying said gear housing extension and wheel, said wheel having clearance relatively to the chamber, the clearance between the rim portion of said wheel and said gear housing extension being so related to the clearance between the wheel and said chamber whereby to allow the wheel to tilt into and out of aligned relation to the axle to allow mounting and demounting of the wheel.

5. In a truck of the class described, a steering and traction unit comprising a gear housing formed with a part extending downwardly at one side of said traction unit, a lateral extension at the lower end of said downwardly extending part of said gear housing, an axle mounted in said extension of the gear housing and having a wheel supporting portion at its outer end, a traction wheel having a bearing on one side thereof whereby it is mounted on said axle portion, a circular bearing horizontally disposed between said gear housing and truck at a line below the upper peripheral portion of said wheel and supporting said gear housing for rotation relatively to said truck with the center of said bearing forming the steering axis of the truck, said wheel having a rim portion extending about the said lateral extension of the downwardly extending part of said gear housing, a portion of said housing above said circular bearing forming a chamber overlying said gear housing extension and wheel, the periphery of said wheel extending into said chamber, the periphery of said wheel having a clearance relatively to said chamber, and said rim portion of said wheel having a clearance relatively to said gear housing extension and being so related to the clearance between the periphery of said wheel and said chamber whereby to allow the wheel to tilt into and out of aligned relation to the axle to allow mounting and demounting of the wheel.

References Cited in the file of this patent

UNITED STATES PATENTS

| | | |
|---|---|---|
| 1,346,857 | Srader | July 20, 1920 |
| 1,346,914 | Sauvage | July 20, 1920 |
| 1,346,915 | Sauvage | July 20, 1920 |
| 1,606,706 | Johnston et al. | Nov. 9, 1926 |
| 2,325,396 | Hastings | July 27, 1943 |
| 2,398,498 | Funk | Apr. 16, 1946 |
| 2,399,605 | Schroeder | Apr. 30, 1946 |
| 2,619,389 | James | Nov. 25, 1952 |
| 2,685,478 | Booth | Aug. 3, 1954 |
| 2,713,918 | Framhein | July 26, 1955 |
| 2,842,216 | Ulinski | July 8, 1958 |

FOREIGN PATENTS

| | | |
|---|---|---|
| 112,609 | Australia | Mar. 6, 1941 |
| 56,920 | France | July 30, 1952 |
| | (1st Add. to 1,002,958) | |